March 16, 1954 G. P. McVEY 2,672,378
LINEAR BEARING
Filed June 14, 1949 3 Sheets-Sheet 1
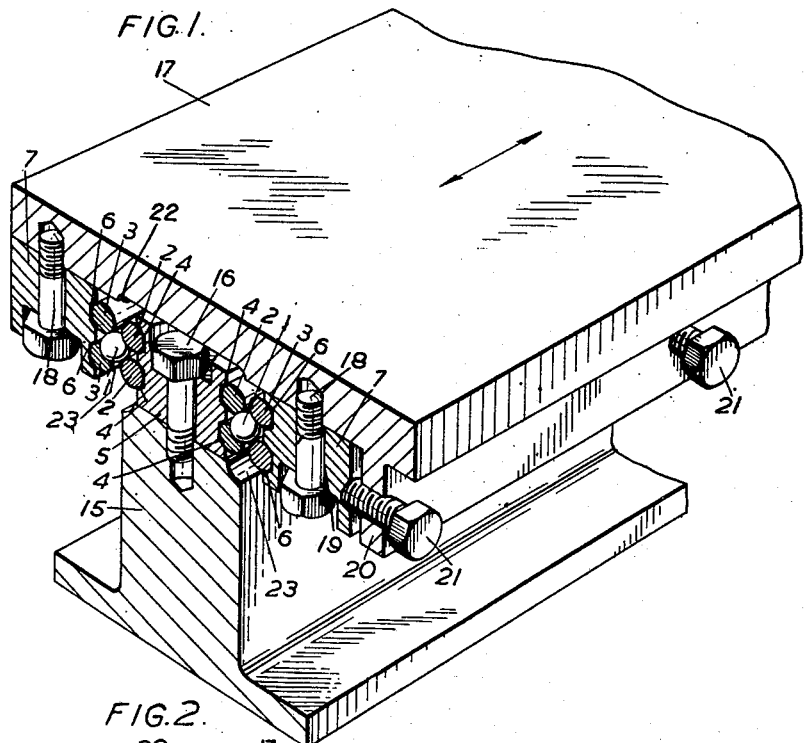
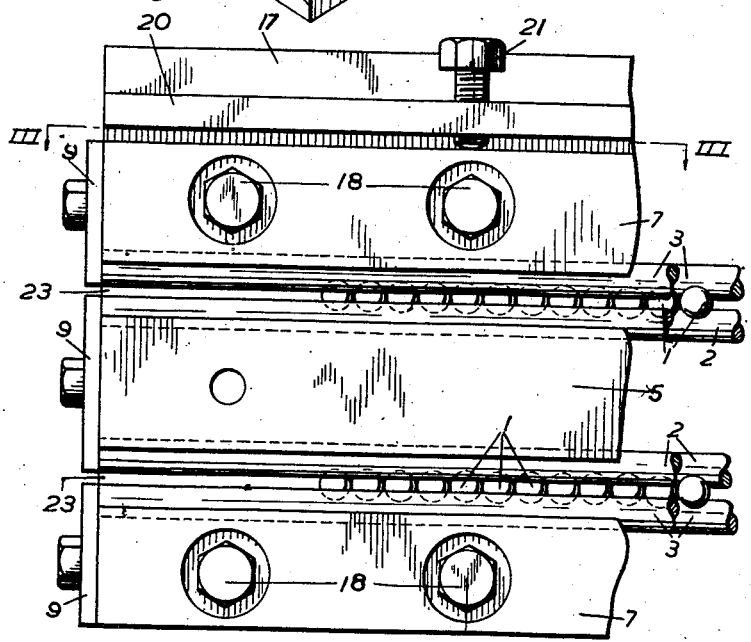
Inventor
George P. McVey
By
Attorney March 16, 1954
G. P. McVEY
2,672,378
LINEAR BEARING
Filed June 14, 1949
3 Sheets-Sheet 2
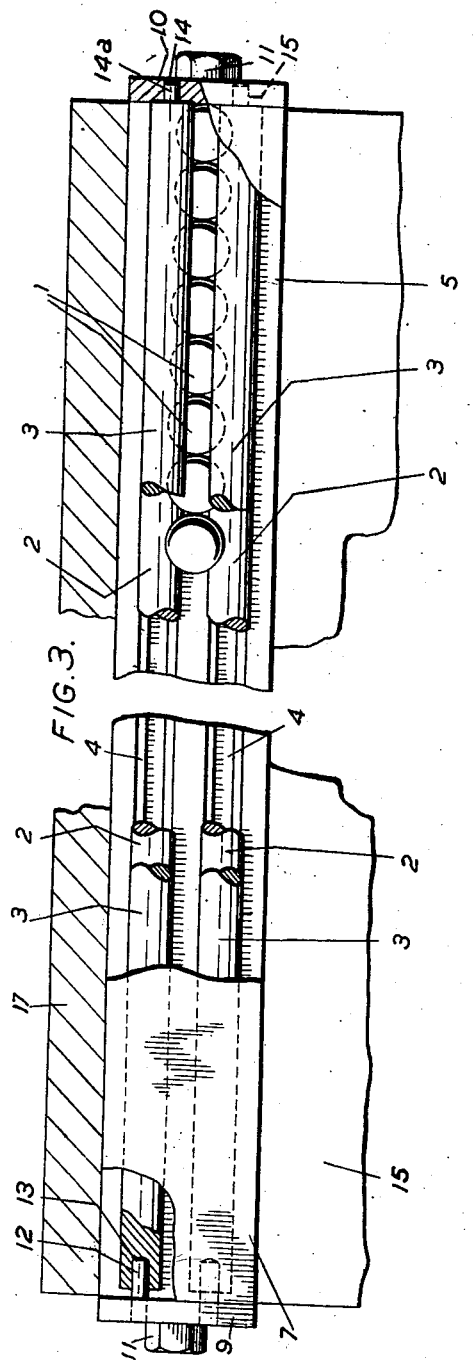
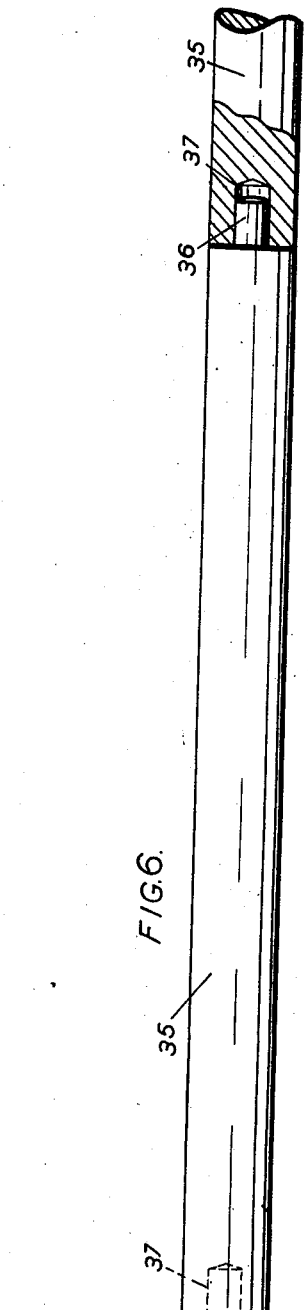
Inventor
George P. McVey
By
Attorney March 16, 1954  G. P. McVEY  2,672,378
LINEAR BEARING
Filed June 14, 1949  3 Sheets-Sheet 3
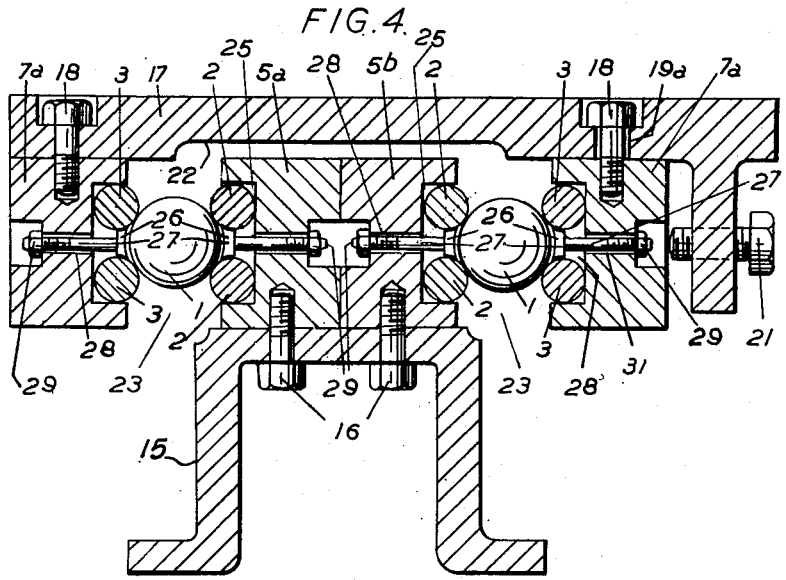
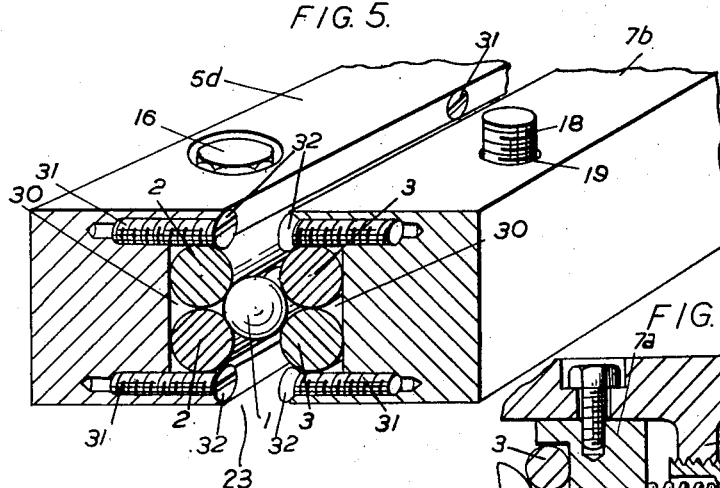
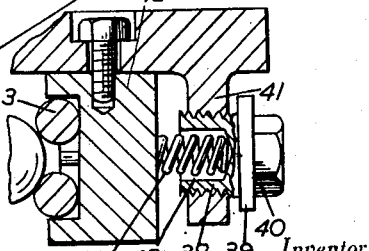
Inventor
George P. McVey
By
Attorney Patented Mar. 16, 1954

2,672,378

UNITED STATES PATENT OFFICE 2,672,378

LINEAR BEARING

George P. McVey, High Wycombe, England

Application June 14, 1949, Serial No. 98,925

Claims priority, application Great Britain
December 7, 1948

8 Claims. (Cl. 308—6)

This invention has reference to improvements in and relating to linear bearings of the type comprising rows of balls in tracks, and the principal object thereof is the provision of a rectilinear ball-bearing assembly wherein an adjustable preload is applied to readily renewable track surfaces for the balls in a direction which is lateral with respect to the rows of balls.

A further object of the invention is the provision of a bearing assembly wherein an open gap is provided beneath the rows of balls and this, coupled with the ready renewability of the track surfaces, provides an assembly particularly suitable for use in machinery working in dust-laden air, such as coal mining machinery, disc-sandpapering machines used in woodworking, and the like, because foreign matter which would normally clog the bearing in the course of time is able to work out of same and frequent clearing operations are unnecessary.

A further object of the invention is the provision of a rectilinear bearing incorporating track surfaces on rods of circular section wherein said rods can be readily provided with a high degree of accuracy by an inexpensive grinding process, for example, prior to assembly, thereby dispensing with the need to grind long plane track surfaces for the balls.

Examples of construction of bearings according to the invention and segmental rods for use in place of single length rods will now be described with reference to the accompanying drawings wherein:

Fig. 1 is a sectional perspective view of the bearing assembly wherein the rods are arranged in V-grooves;

Fig. 2 is an inverted plan view of one end of the said bearing assembly;

Fig. 3 is a sectional elevation on the line III—III, Fig. 2;

Fig. 4 is an end sectional elevation of a bearing assembly wherein the rods are held in rectangular channels by wedge-headed bolts located between the rods of each pair;

Fig. 5 is an end sectional perspective view of a bearing for use in the assembly wherein the rods are held in rectangular channels by countersunk-headed screws arranged above and below the rods of the pairs;

Fig. 6 is a detail showing a rod segment abutting an end of the adjacent segment of a run; and Fig. 7 is a detail in sectional elevation showing how an adjustable preload may be applied to the track surfaces of the assembly by means comprising a spring.

The bearing shown in Figs. 1, 2 and 3 comprises two parallel rows of balls, indicated by 1, 1, spaced apart horizontally. At one lateral side of each row of balls is a pair of rods 2, 2 whilst a pair of rods 3, 3 is located at the opposite lateral side of each row. The rods at the lateral sides furthest from the balls with which they are associated are accommodated in grooves 4, 4 and 6, 6 for the respective pairs, said grooves being in the upright sides of carriers 5 and 7, respectively. The grooves 4 and 6 are shallower than the diameter of the rods 2 and 3. End plates 9 and 10 secured to the carriers by bolts 11 limit the run of the balls and hold the rods in position on the carriers. For the latter purpose the plates at one end of the bearing have inwardly directed pins 12 entering sockets 13 in the corresponding ends of the rods whilst the plates at the opposite end have holes 14 for the reception of spigots 14a on the adjacent ends of the rods.

It will be evident that the rods lie snugly in the grooves whilst the carriers provide rigid backings or supports for the rods. Milling the grooves or otherwise forming them in the carriers is a simple operation having regard to the fact that the carriers may be of comparatively soft metal, such as mild steel, because it is the hardened steel rods 2, 2 and 3, 3 at the upper and lower sides of the balls against which the said balls work. Partial rotation of the rods brings new track surfaces into contact with the balls.

Carrier 5 is formed by a single longitudinal block. This block is secured to a fixed bracket or support 15 by means of bolts 16. The carriers 7, 7 are secured to the underside of a worktable or the like 17 by bolts 18. The holes 19 for the bolts 18 in the right hand carrier 7, Fig. 1, are wider than these bolts so that the said carrier can have limited movement laterally; and on the underside of the worktable is a longitudinal flange 20, parallel with the said carrier, carrying bolts 21 which can be tightened to force the said carrier towards the carrier 5. Thus, when the bolts 21 are tightened, i. e., screwed towards the carriers, the carriers 7, which are the outer or sidemost carriers are pulled (as regards the carrier at the left hand side of the figure) and pushed (as regards the carrier nearest to the flange) towards the carrier 5, which is the inner carrier. In this manner lateral pressure is applied to the carrier, rods and balls, ensuring close contact of the rods with the balls. It will be appreciated that it is the worktable which applies the inward pull to the said left hand carrier. When it is desired to effect a partial rotation of the rods to bring new tracking surfaces into use the bolts 21 are slackened, the rods are partially turned and then the bolts 21 are re-tightened.

The underside of the worktable is recessed longitudinally at 22 to lie clear of the inner carrier.

Owing to the rows of balls being located in tracks at their lateral sides and to the carriers for the tracks being correspondingly located, as shown and owing to the depth of the grooves 4 and 6 not being substantially greater than the diameter of the rods 2 and 3, permanently open gaps 23 are provided beneath the balls so that foreign matter is free to work downwards and to drop freely from the assembly through the said gaps.

The assembly according to Fig. 4 differs from that according to Figs. 1 to 3 principally in that the central carrier, i. e., the carrier mounted on the block 15 (of hollow form in Fig. 4) is in two parts 5ª and 5ᵇ, the rods 2, 2 and 3, 3 are arranged in channels or grooves 25 of substantially rectangular form, each channel accommodating a pair of rods, and the rods are retained by clamping elements comprising the wedge-headed ends 26 of bolts 27 located between the rods, there being a run of bolts 27 to each pair of rods. It will be seen that the bolts 27 extend through lateral holes 28 in the carriers (5ª—5ᵇ and 7ª) and are held by nuts 29. When it is desired to provide new bearing surfaces for the balls 1, 1 the nuts 29 are slackened (and so are the bolts 21) and the rods are given a partial rotation. Thereafter the nuts 29 and the bolts 21 are re-tightened. Another difference between Fig. 4 and Figs. 1 to 3 is that the fixing bolts 18, Fig. 4, pass through holes in the worktable or the like 17 and screw into the carriers 7ª, whilst the bolts 16 pass through holes in the block 15 and screw into the carrier parts 5ª and 5ᵇ. Hole 19ª is large enough to permit of lateral movement of the carrier at this side in order to enable the carrier to be closed towards the balls.

In Fig. 5, which shows two carriers with rods 2, 2 and 3, 3 and balls 1 disposed for the right hand side of the bearing assembly, the rods of each part are in contact with each other within substantially rectangular channels or grooves 30 and runs of countersunk or wedge-headed screws 31 above and below the pairs hold the rods within the channels or grooves by contact of their heads 32 with the rods, said screws entering the carriers 5ᵈ and 7ᵇ. The open gap beneath the balls is indicated at 23.

The movable body, such as the worktable of a machine tool, to which the bearings are applied may be provided with as many bearings as desired.

The rods 2 and 3 may each consist of a continuous length of hardened steel or may be built up of segments abutting end-to-end, the segments being joined together to a sufficient degree for assembly purposes by having their ends spigoted and socketed in complementary manner. One such segment and part of the next are shown in Fig. 6, the segments being indicated by 35, the spigot shown by 36 and two sockets by 37. The socket at one extreme end of the run of segments receives a pin 12 and the spigot at the other end of the run enters a hole 14.

It should be mentioned that the principal reason for making the rods in segments is to ensure ease of manufacture, as it is found shorter lengths can be made more easily and accurately and hardened and ground more easily than can long lengths.

Instead of preloading the track surfaces by the direct thrust of screw means (the screws 21), preloading may be effected by compression springs. An arrangement incorporating a preloading spring is shown in Fig. 7.

In Fig. 7 a hollow screw-threaded bush 38 having a head formed by a flange 39 and a hexagonal portion 40 screws into the flange 41, comparable with the flange 20 shown in Figs. 1, 2 and 4; and the hollow 42 of the bush receives a spring 43 which seats in the closed end of the hollow and thrusts against the carrier 7ª of the bearing assembly. Thus, the spring can be compressed with increasing force until the flange 39 meets the flange 41, and the pressure applied to the spring determines the extent of the preload on the tracking rods. Owing to this arrangement it is possible to prevent an excessive preload being applied to the tracking rods. When the arrangement according to Figure 7 is incorporated in the assembly the screws 21 are preferably retained since, after the movable outer carrier 7ª has been preloaded by the springs and the carrier 7ª locked in position by the bolts 18, the screws 21 may be tightened, finger tight, for the purpose of providing a support, additional to that provided by the locking means comprising the bolts 18, said additional support acting in the direction of preloading of the movable carrier.

Where a worktable or other element is to have universal movement in a plane on the bearings, one bearing assembly is arranged at right angles to a corresponding assembly in a manner permitting of such movement. Such an arrangement will be obvious to those skilled in the art.

Bearings in accordance with the invention may, of course, be applied to existing plain slides and the like to convert such machinery to ball bearing design.

Although the invention has been described more particularly with reference to an assembly wherein the worktable is horizontal, the accompanying claims are also to be read as including an assembly wherein the worktable or the equivalent is vertical so that the parallel rows of balls are in vertically spaced relation. In such an arrangement the carriers may have holes passing through them from the base of the grooves to the opposite side for the egress of foreign matter.

What I claim is:

1. An anti-clogging rectilinear ball-bearing assembly comprising inner carrier means, two pairs of cylindrical track rods respectively mounted in substantially parallel relation on each of two opposite sides of said inner carrier means, outer carrier means including two outer carriers respectively disposed on opposite sides of said inner carrier means, a pair of cylindrical track rods on the inner side of each outer carrier and respectively facing said pairs of rods on said inner carrier means, each said pairs of rods being substantially horizontal with the rods of each pair disposed one above the other and with the outer pairs of rods substantially parallel to the respective inner pairs of rods to define substantially parallel trackways that are each longitudinally substantially horizontal and laterally substantially vertical, and a plurality of balls in each of said trackways and constituting lateral supports between said inner and outer carrier means, the trackway forming portions of the lower rods of each pair being supported from the respective carrier means so that said portions are at least even with the side of such carrier means and the lower rods of the respective outer and inner pairs being spaced to define a dirt discharging slot at the bottom of each trackway.

2. A bearing assembly, as defined in claim 1, wherein said outer carrier means comprises means rigidly supporting one said outer carrier, means supporting the other said outer carrier for movement toward and from said inner carrier means and said one outer carrier and for releasably and rigidly securing said other outer carrier in selected position, and resilient preloading means biasing said other outer carrier toward said inner carrier means and said one outer carrier.

3. A bearing assembly, as defined in claim 2, wherein said outer carrier means comprises a support, said one outer carrier support means including means releasably securing said one outer carrier rigidly to said support in fixed relation, said other outer carrier support means comprises means releasably securing the said other outer carrier rigidly to said support and permitting movement of said other outer carrier toward and from said inner carrier means and said one outer carrier when said other outer carrier securing means is released, and said resilient means comprises adjustably tensioned spring means on said support and engaging said other outer carrier to bias said carrier toward said inner carrier means and said one outer carrier when said other outer carrier securing means is released.

4. A bearing assembly, as defined in claim 3, wherein said support comprises a flange outside of and substantially parallel to said other outer carrier, said flange having an internally threaded bore, and said spring means comprises a screw selectively threaded in said bore and a spring interposed between said screw and said other outer carrier.

5. A bearing assembly, as defined in claim 4, wherein said screw is hollow at its inner end and one end of said spring is seated in said hollow end.

6. A bearing assembly, as defined in claim 1, wherein said track rods of each pair are in lateral contact with each other to preclude dirt collecting channels therebetween.

7. A bearing assembly, as defined in claim 1, wherein said track rods are removably mounted on said carrier means by wedge headed screws threaded into said carrier means on opposite sides of the rods of each pair, the wedge heads of said screws pressing said rods into lateral contact with each other to preclude dirt collecting channels therebetween.

8. A bearing assembly, as defined in claim 1, wherein said track rods each comprise a plurality of axially aligned abutting sections.

GEORGE P. McVEY.

References Cited in the file of this patent

UNITED STATES PATENTS

| Number | Name | Date |
|---|---|---|
| 1,381,188 | Gury | June 14, 1921 |
| 1,618,990 | Metters | Mar. 1 1927 |
| 1,846,019 | Bangser | Feb. 23, 1932 |
| 2,264,302 | Delvin | Dec. 2, 1941 |
| 2,343,575 | Penney | Mar. 7, 1944 |

FOREIGN PATENTS

| Number | Country | Date |
|---|---|---|
| 133,416 | Great Britain | 1919 |
| 889,829 | France | Jan. 20, 1944 |